(12) United States Patent
Schivalocchi et al.

(10) Patent No.: US 9,523,430 B2
(45) Date of Patent: Dec. 20, 2016

(54) PISTON FOR A DIE-CASTING MACHINE

(75) Inventors: Carlo Schivalocchi, Brescia (IT); Chiara Schivalocchi, Brescia (IT); Nicola Schivalocchi, Brescia (IT)

(73) Assignee: Copromec Die Casting S.r.l. A Socio Unico, Roè Volciano (IT)

( * ) Notice: Subject to any disclaimer, the term of this patent is extended or adjusted under 35 U.S.C. 154(b) by 357 days.

(21) Appl. No.: 14/129,059

(22) PCT Filed: Jun. 27, 2012

(86) PCT No.: PCT/IB2012/053256
§ 371 (c)(1),
(2), (4) Date: Jan. 13, 2014

(87) PCT Pub. No.: WO2013/001469
PCT Pub. Date: Jan. 3, 2013

(65) Prior Publication Data
US 2014/0123848 A1    May 8, 2014

(30) Foreign Application Priority Data
Jun. 28, 2011   (IT) ................. BS2011A0095

(51) Int. Cl.
*F01B 7/20* (2006.01)
*F16J 1/08* (2006.01)
*B22D 17/20* (2006.01)

(52) U.S. Cl.
CPC ............ *F16J 1/08* (2013.01); *B22D 17/203* (2013.01); *B22D 17/2038* (2013.01)

(58) Field of Classification Search
CPC ................. B22D 17/203; B22D 17/2038
USPC .......................................... 92/53
See application file for complete search history.

(56) References Cited

U.S. PATENT DOCUMENTS

| | | | | |
|---|---|---|---|---|
| 5,562,170 A | * | 10/1996 | Wolfer | E21B 4/14 173/208 |
| 6,237,672 B1 | * | 5/2001 | Perrella | B22D 17/2038 164/149 |
| 2009/0139683 A1 | * | 6/2009 | Muller | B22D 17/2038 164/312 |

FOREIGN PATENT DOCUMENTS

| | | | |
|---|---|---|---|
| DE | 39 13 494 A1 | 11/1990 | |
| DE | 297 21 722 U1 | 3/1998 | |
| DE | 199 38 075 A1 | 10/2000 | |
| IT | WO 2009125437 A1 * | 10/2009 | ........ B22D 17/203 |
| JP | 57-68257 A | 4/1982 | |
| JP | 2009-279645 A | 12/2009 | |
| JP | 2010-269319 | 12/2010 | |

(Continued)

OTHER PUBLICATIONS

Machine Translation of DE19938075.*

*Primary Examiner* — Thomas E Lazo
*Assistant Examiner* — Daniel Collins
(74) *Attorney, Agent, or Firm* — Blank Rome LLP

(57) ABSTRACT

A piston for a die-casting machine, in particular with a cold chamber, comprises a stem which extends from a proximal end to a distal end along a piston axis and a piston head which extends from the distal end of the stem and which has a side wall with at least one sealing area suitable to form a seal on the wall of said container of the press. A lubrication circuit suitable for favoring the sliding of the piston comprises first lubrication ducts made in the stem and ending at the distal end of said stem, and second ducts made in the piston head, fluidically communicating with said first ducts and coming out in the lateral wall at least in correspondence with said sealed area.

20 Claims, 15 Drawing Sheets

(56) References Cited

FOREIGN PATENT DOCUMENTS

WO     WO 2007/116426 A1    10/2007

\* cited by examiner

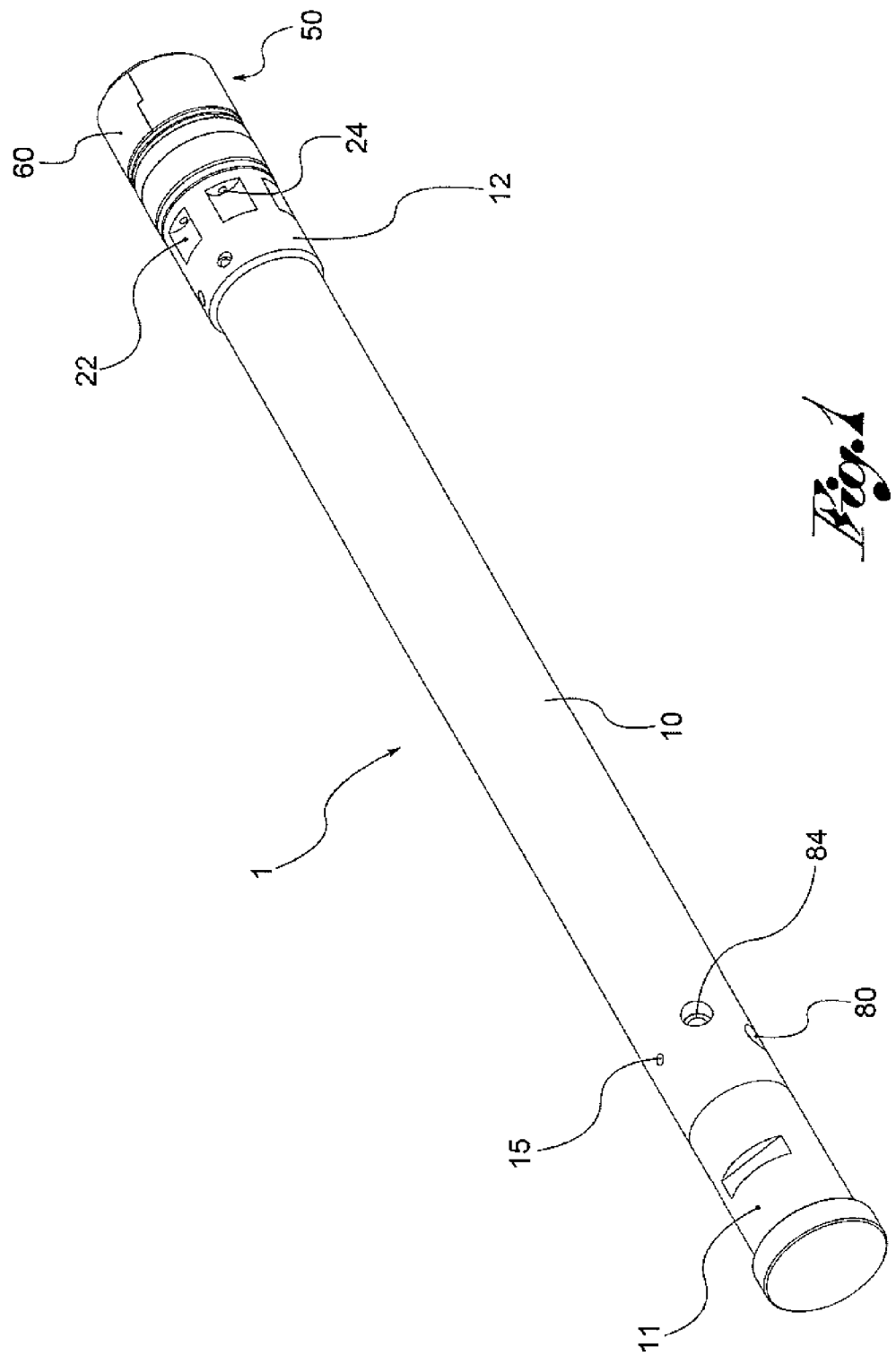

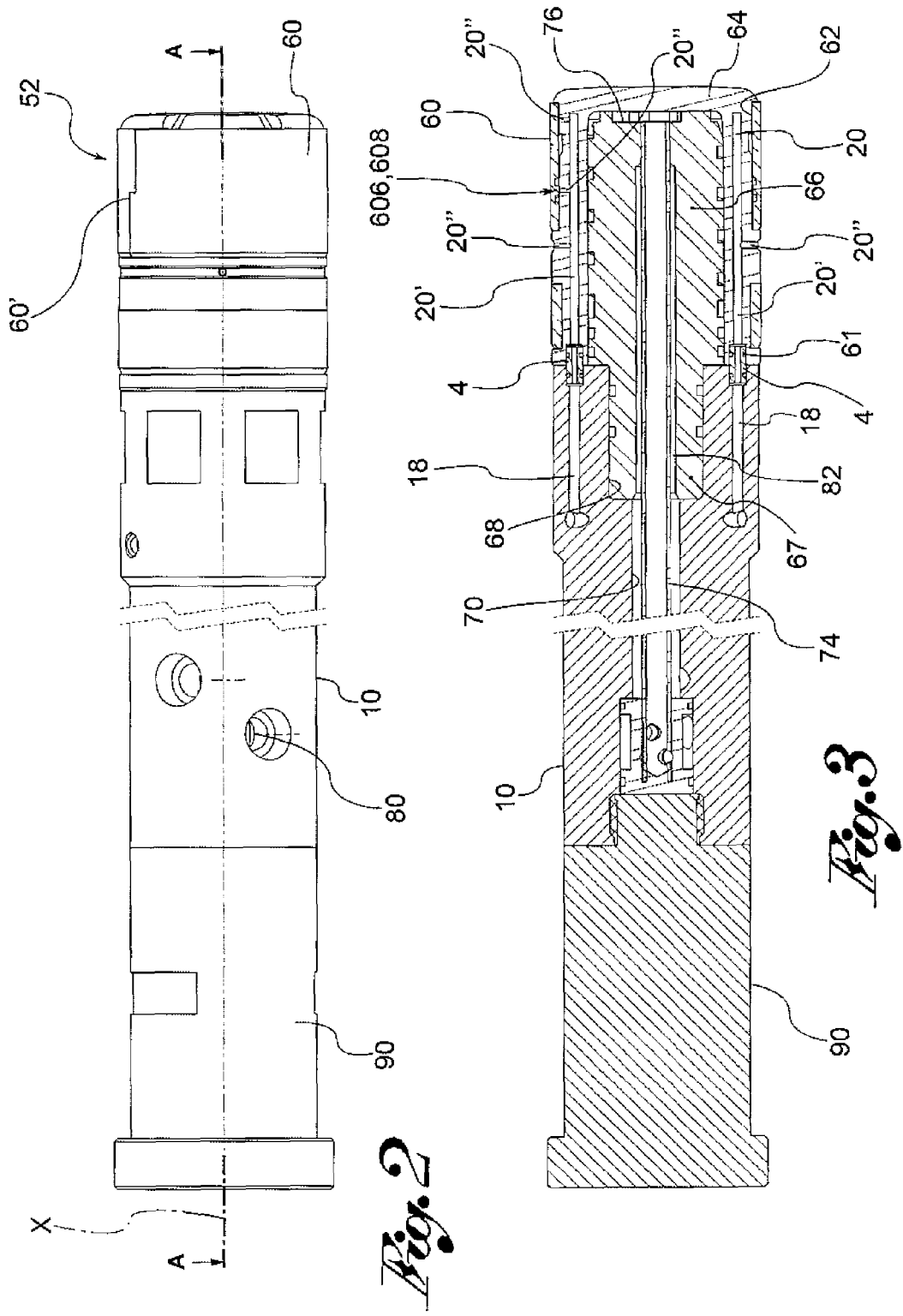

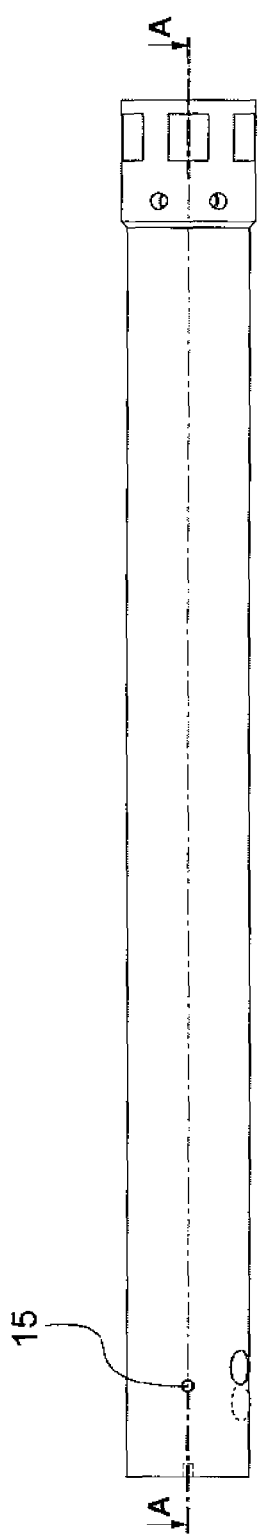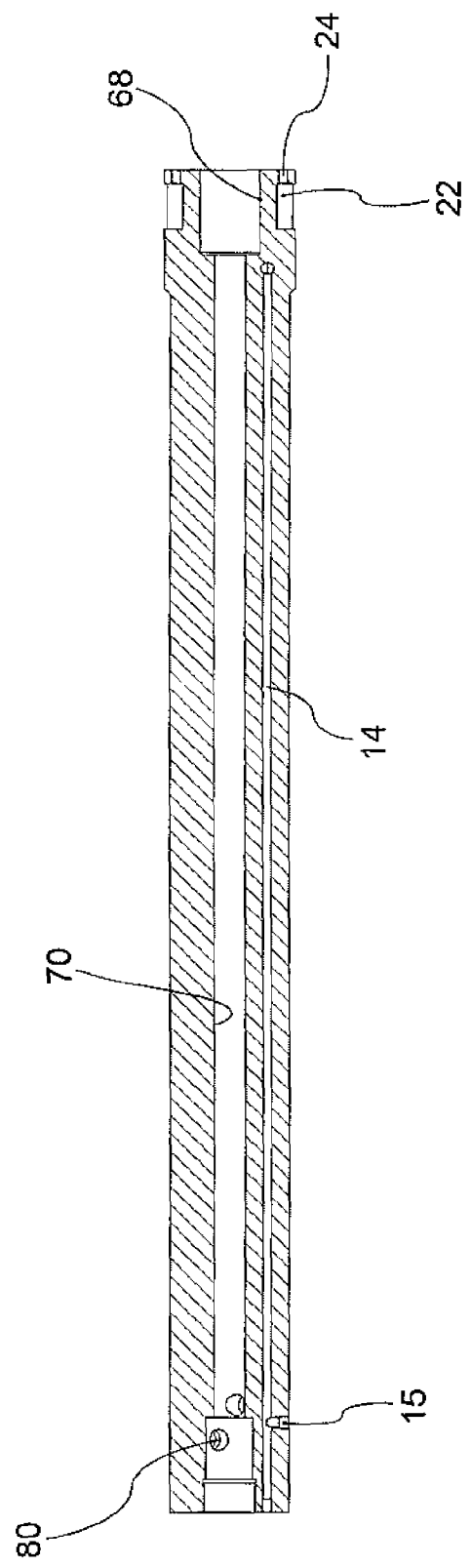

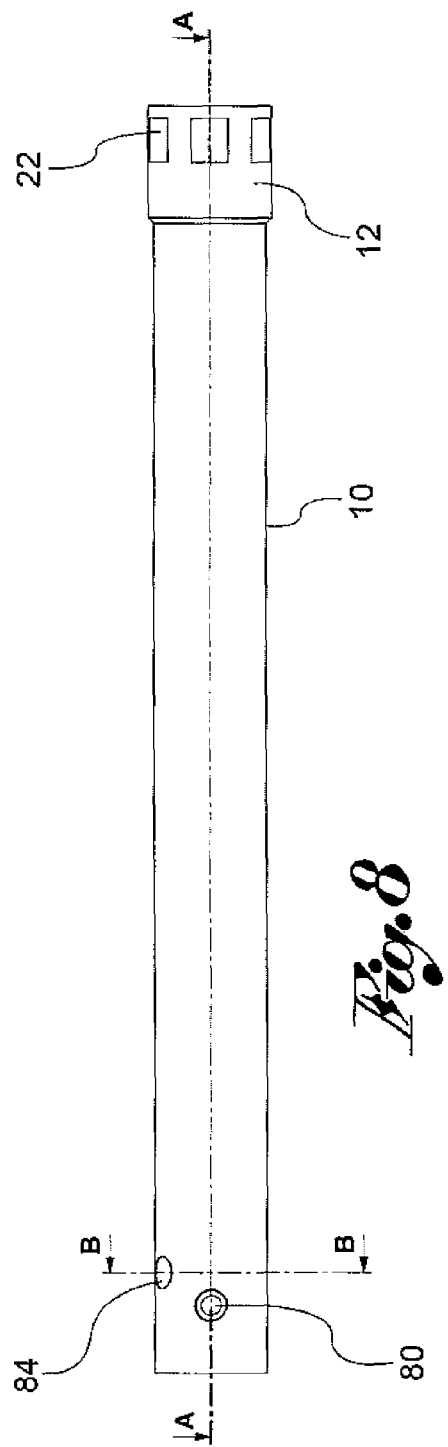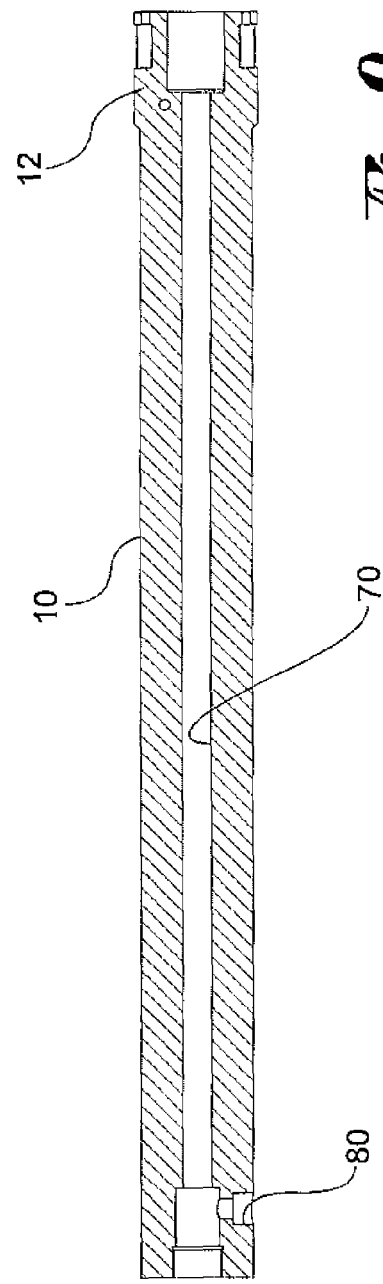

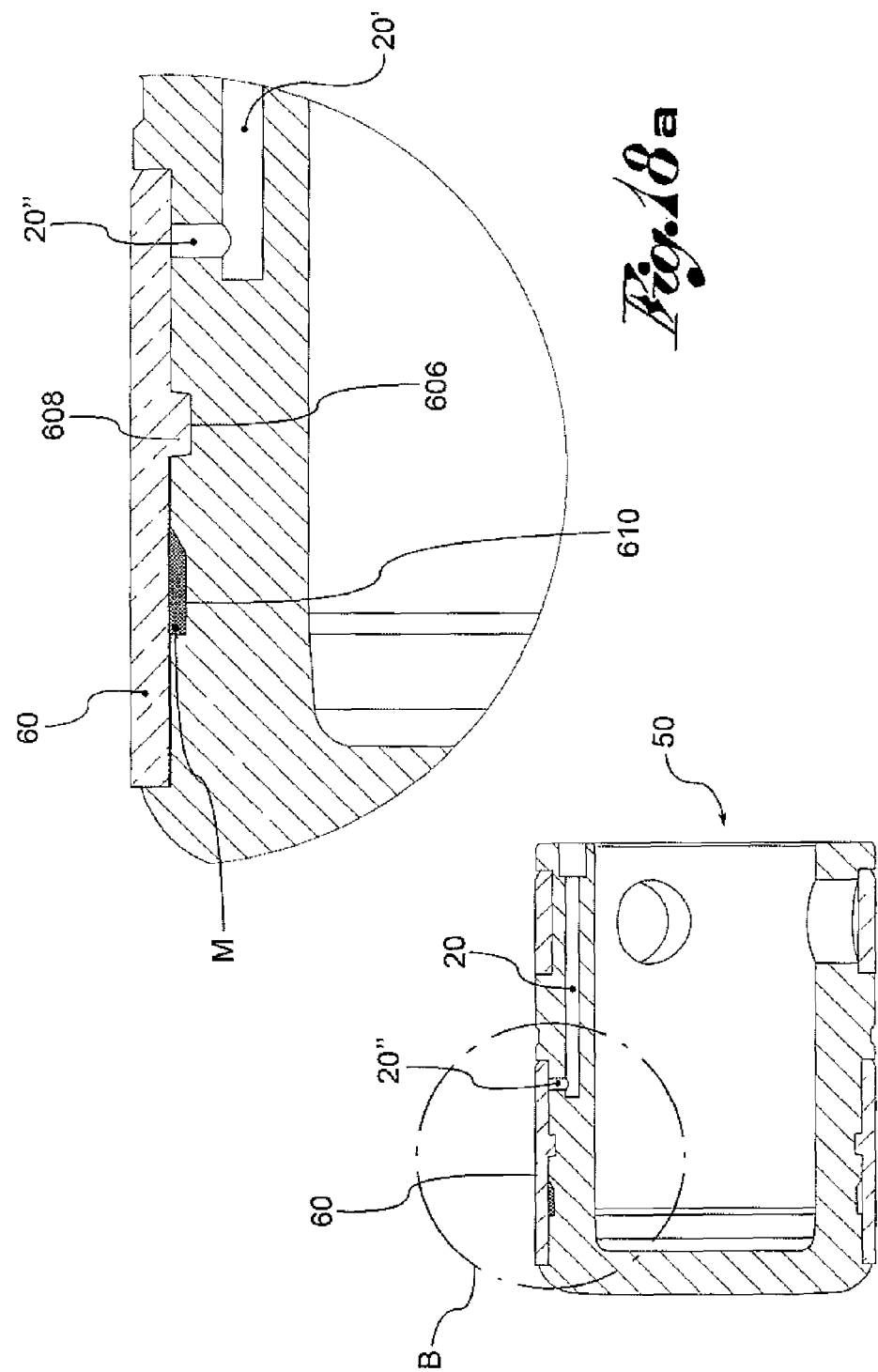

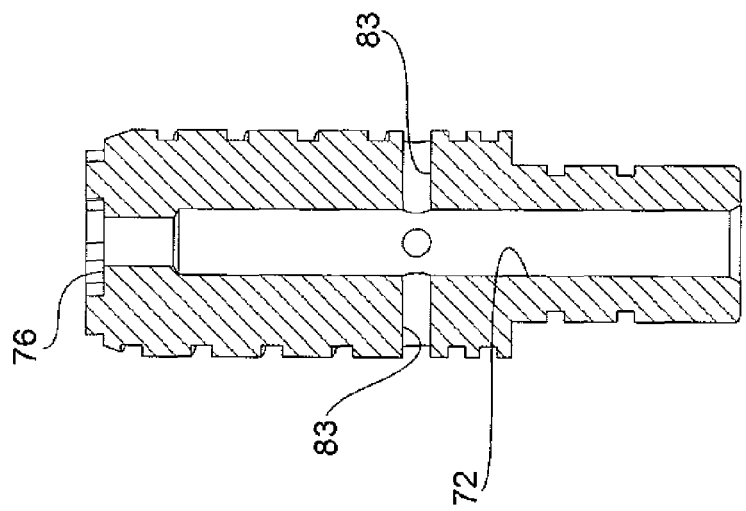
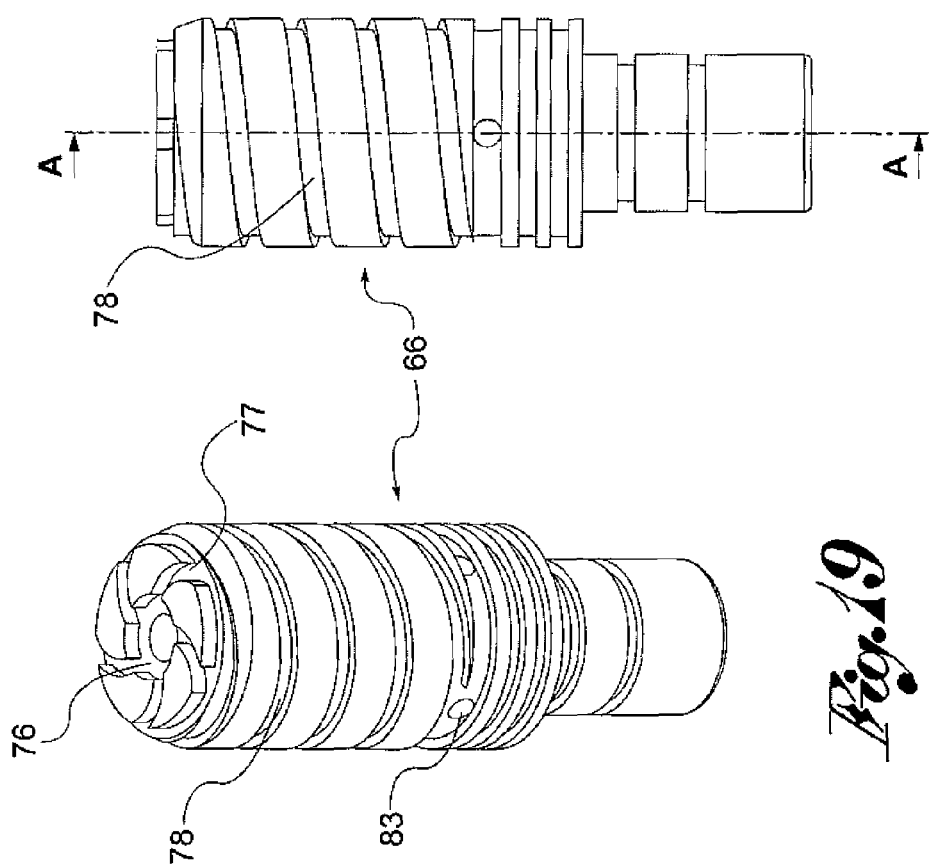
Fig. 21
Fig. 20
Fig. 19

PISTON FOR A DIE-CASTING MACHINE

The present invention relates to a piston for a die-casting machine, in particular, of the cold chamber type. In particular, the present invention relates to a piston with a lubrication circuit suitable for encouraging the sliding of the piston in a container of molten metal of a press for such die-casting machine.

According to the preamble of claim 1, a piston for a die-casting machine comprises a stem and a piston head having a lateral wall with at least one sealing zone suitable for making a seal on the container wall of the press. Pistons further provided with a lubrication circuit are already known.

In particular, it is known to make a piston with a lubrication bush placed around the stem in a position rearward of the head, so as not to interfere with the sealing action performed by the head on the container walls. A lubrication duct is made in the stem which branches out into a series of holes coming out in the bush. The lubricant is fired towards the head through a plurality of nozzles of the bush.

Such an embodiment solution makes it possible to lubricate the piston even during functioning, and not just at the start of functioning as occurred previously, but still presents some drawbacks or limitations.

In particular, the lubrication has its greatest effect far from the head of the piston, and especially far from the area of greatest friction between the head and the container, that is the sealing area. In fact, such area is very close to the front end of the piston, where the lubricant emitted by the lubrication bush cannot reach.

Since the lubricant does not reach the area of greatest friction between the piston and the container in a targeted manner, attempts are made to improve the sliding of the piston by injecting a large amount of lubricant, much greater than would be needed if it were possible to lubricate the piston in the sealing area.

Such extensive use of lubricant far from the head also entails a leakage of lubricant from the container.

Given that the lubricant is injected by the lubricating nozzles in an area which, being away from the head does not undergo the same cooling as the head, the lubricant undergoes a phase change passing to a gaseous state, diminishing in efficacy and generating fumes which must be aspirated.

In the case of containers fitted with an aspiration duct for placing them in a vacuum, the presence of lubricant in a gaseous state in the container means that the lubricant is aspirated from such duct rather than being deposited on the piston.

To attempt to overcome such drawbacks, pistons with lubrication holes coming out near the head, in the sealing area with the container, have been proposed. Examples of such pistons are described in DE3913494A1, JP2009279645A, DE29721722U1, JP2010269319A. However, even these embodiments of the piston have proved unsatisfactory, especially on account of the fact that the end section of the lubrication ducts, open on the sealing surface of the piston, is soon obstructed by the metal which in the liquid state penetrates between the piston and the container, and which solidifies forming a lamina which plugs the lubrication duct.

The piston with the lubrication bush lastly proves complex to make and requires frequent maintenance, especially to remedy the breakage and obstruction of the tubes and of the lubrication nozzles.

The purpose of the present invention is therefore to propose a piston for a die-casting machine which makes it possible to overcome the aforesaid limitations of the pistons according to the prior art.

Such purposes are achieved by a piston according to claim 1.

The characteristics and advantages of the piston according to the present invention will be evident from the description given below, by way of a non-limiting example, of its preferred embodiments, according to the appended drawings. In said drawings:

FIG. 1 shows a piston according to the invention, in a first embodiment, in a perspective view;

FIG. 2 is a side view of the piston;

FIG. 3 is an axial cross-section of the piston along the line A-A in FIG. 2;

FIG. 6 is a side view of the stem;

FIG. 7 is an axial cross-section of the stem along the line A-A in FIG. 6;

FIG. 8 is another side view of the stem;

FIG. 9 is an axial cross-section of the stem along the line A-A in FIG. 8;

FIG. 10 is a transversal cross-section of the stem along the line B-B in FIG. 8;

FIG. 18 is an axial cross-section of only the head of the piston in FIG. 17, in which the metal penetrating under the sealing ring is shown;

FIG. 18a is an enlarged view of the detail B circled in FIG. 21;

FIGS. 19, 20 and 21 show a perspective view, side view and axial cross-section view, respectively, of an axial support pin of the piston head;

In the continuation of the description, when possible, the elements common to the various embodiments of the invention will be indicated using the same reference numerals.

Figure 4:
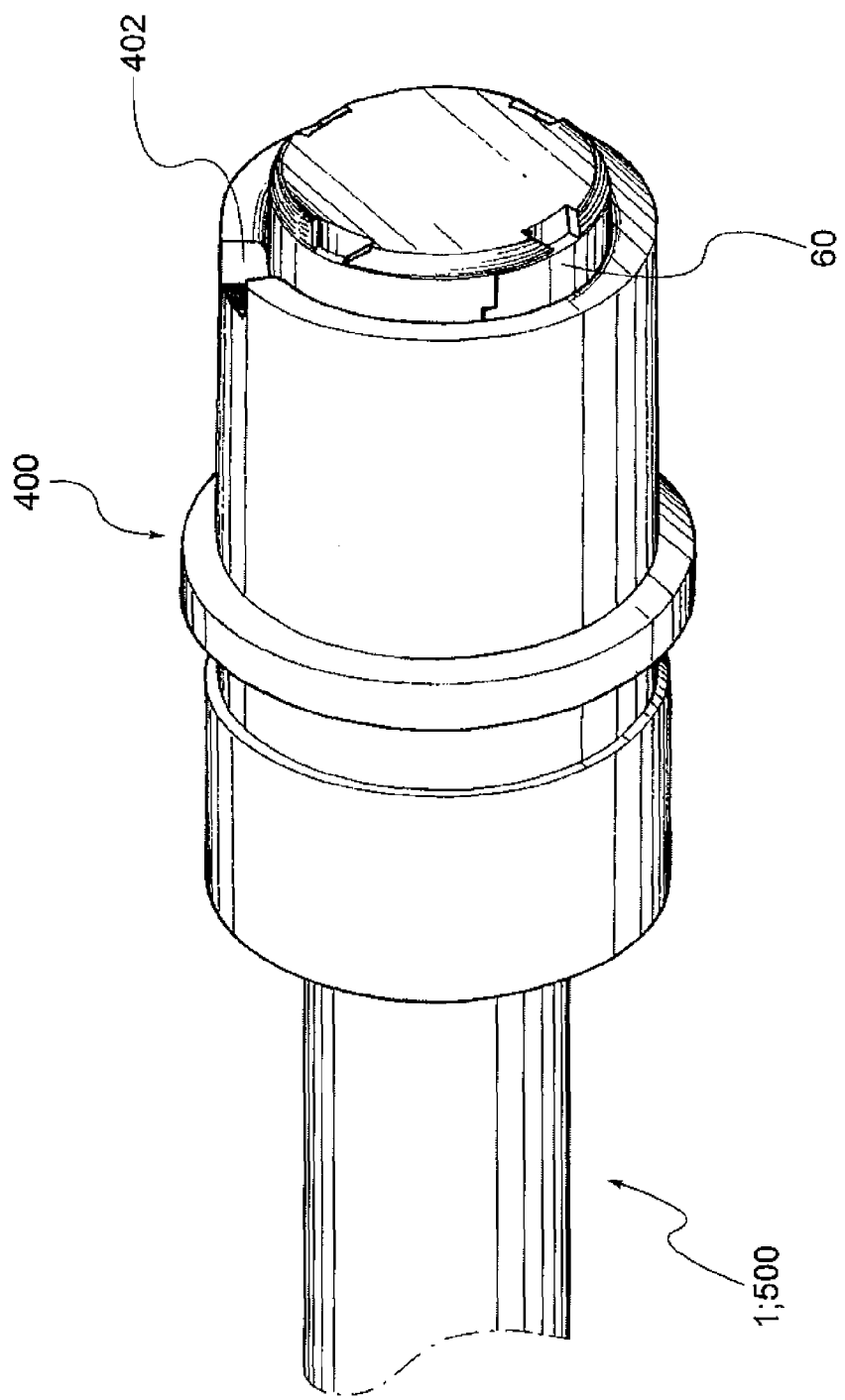
FIG. 4 shows the piston inserted in a container of a press of a die-casting machine.
Figure 5:
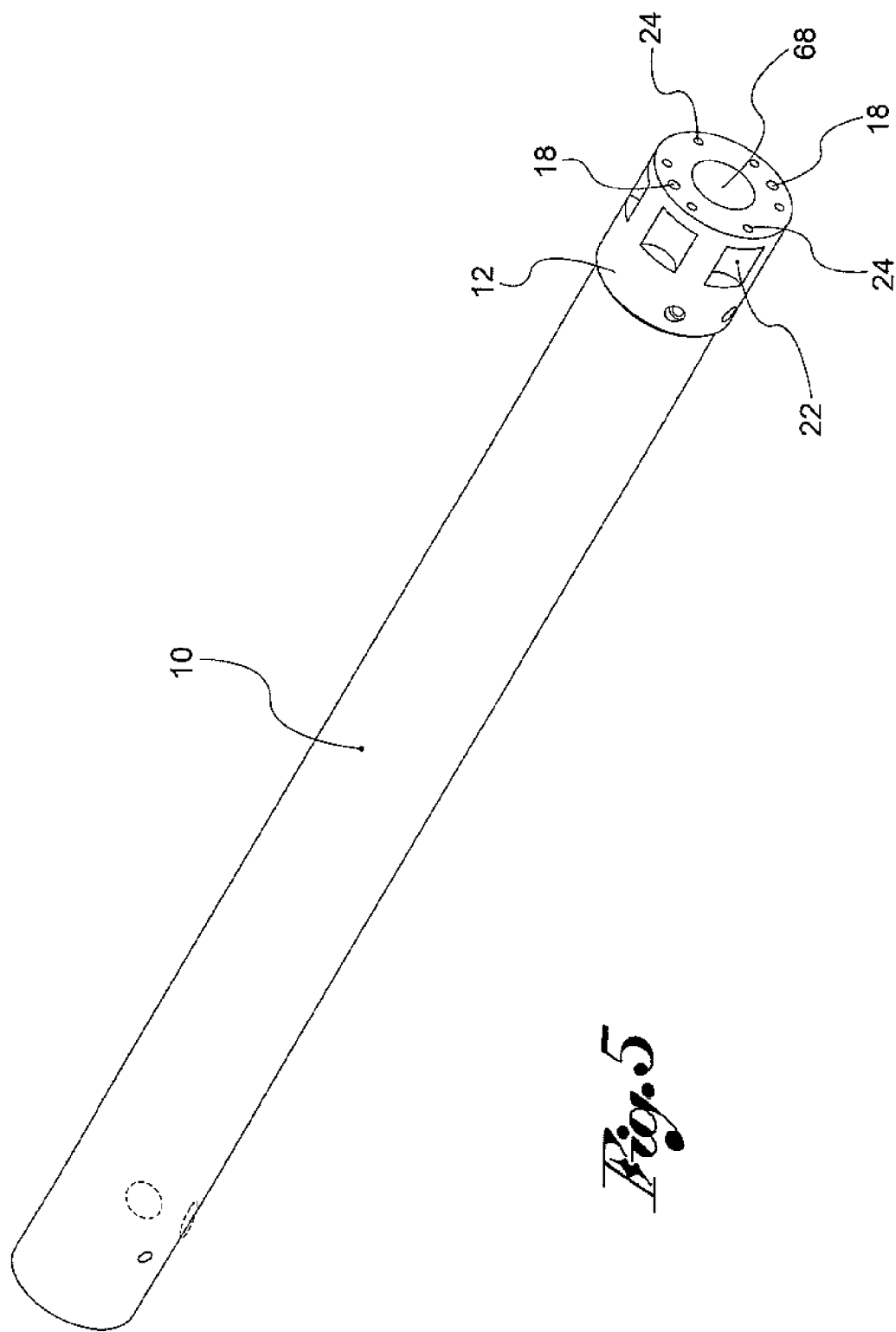
FIG. 5 shows, in a perspective view, just the stem of the piston.
Figure 12:
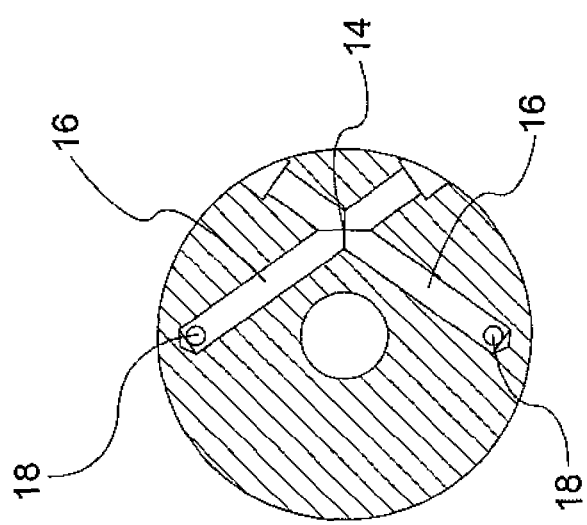
FIG. 12 is a transversal cross-section of the end of the stem along the line D-D in FIG. 11.
Figure 11:
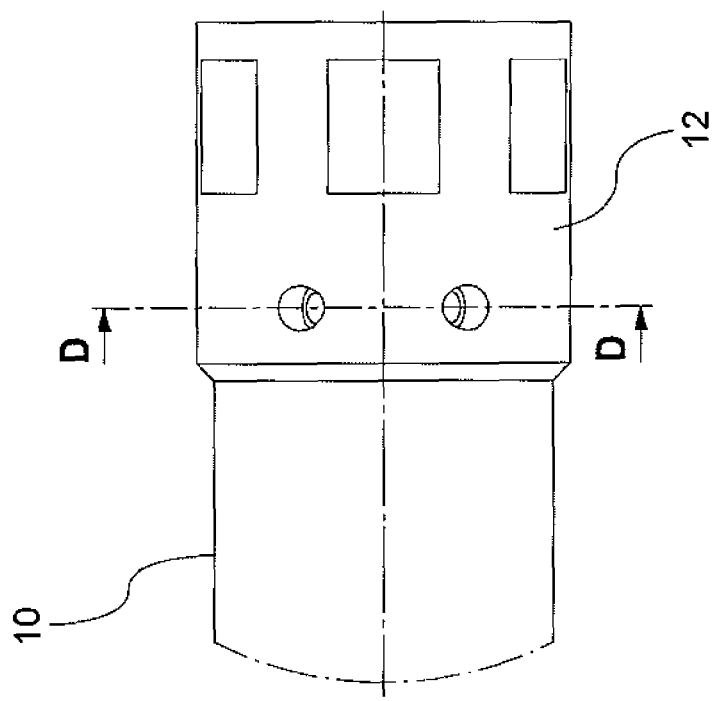
FIG. 11 is an enlarged side view of the distal end of the stem.
Figure 15:
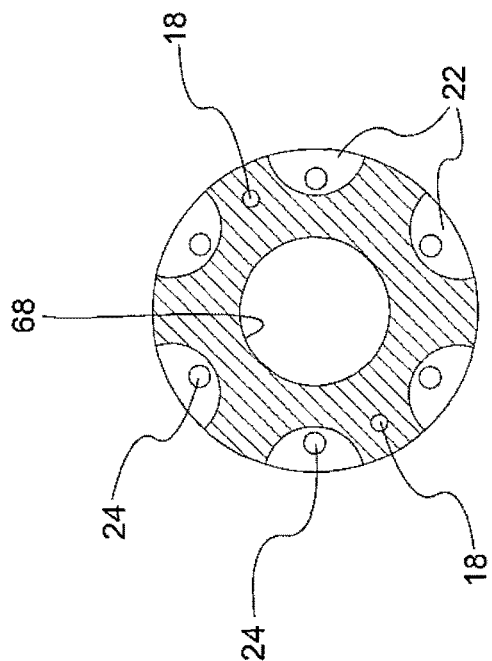
FIG. 15 is a transversal cross-section of the end of the stem along the line E-E in FIG. 13.
Figure 14:
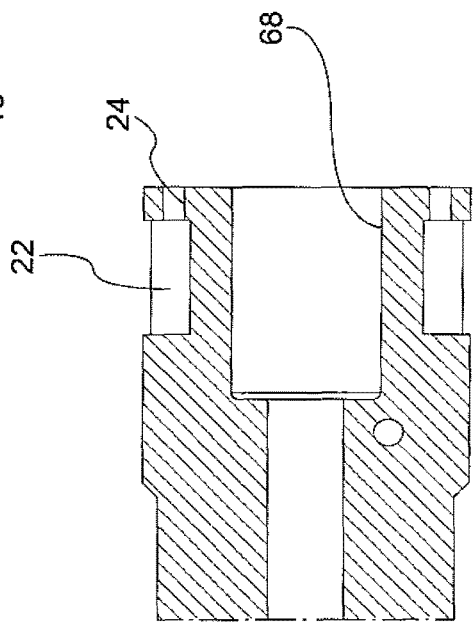
FIG. 14 is an axial cross-section of the end of the stem along the line C-C in FIG. 13.
Figure 13:
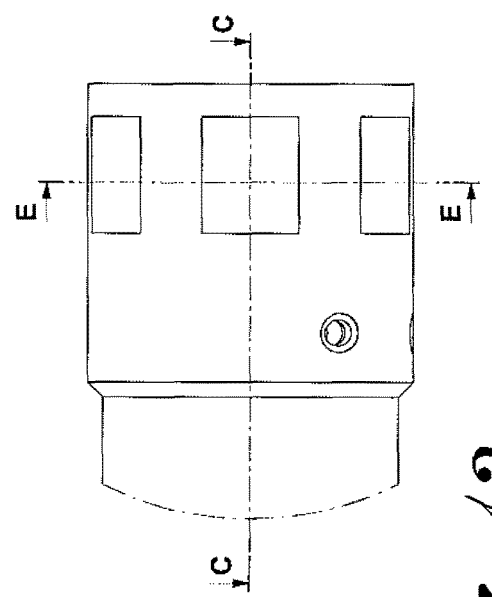
FIG. 13 is an enlarged side view of the distal end of the stem.

In addition, unless specifically indicated otherwise, elements described for one piston embodiment may also be present, adapted as needed where necessary, in other piston embodiments described.

With reference to the appended drawings, reference numerals 1; 500; 700 indicate a piston of a press of a die-casting machines, in particular, of the cold chamber type. The press comprises a container 400 in which the piston 1; 500; 700, or least its terminal thrust part of the molten metal, is housed so as to slide. The container 400 has a loading mouth of the molten metal, such as aluminium, made in an upper part and at one end. At the opposite end to said loading mouth, the container 400 has splits 402 corresponding to starting points of casting branches coming out in a mould. The piston 1; 500; 700 therefore slides axially inside the container 400 to push the metal fed through the loading mouth into the casting branches and thence the mould.

The piston 1; 500; 700 comprises a stem 10; 510; 710 which extends from a proximal or rear end 11 in relation to the direction of advancement of the piston in the container, and a distal or front end 12; 512; 712, along a piston axis X.

The piston 1; 500; 700 ends with a piston head 50; 550; 750 which extends from the distal end 12; 512; 712 of the stem and which has a lateral wall with at least one sealing zone 52; 552; 752 suitable for making a seal on the wall of said container 400 of the press.

The piston 1; 500; 700 is provided with a lubrication circuit suitable for favouring the sliding of the piston in the container 400.

Said lubrication circuit comprises first lubrication ducts 14, 16, 18 made in the stem 10; 510; 710 and ending at the distal end 12; 512; 712 of said stem, and second ducts 20 made in the piston head 50; 550; 750, fluidically communicating with said first ducts and coming out in the lateral wall at least in correspondence with said sealed area 52; 552; 752.

In one embodiment shown in FIGS. 1-15, the first lubrication ducts comprise a feed duct 14 which extends longitudinally from an entrance hole 15 of the lubricant and which branches into at least two distribution ducts 18 angularly equidistant from the piston axis X.

The second lubrication ducts 20 are a continuation of said distribution ducts 18. In other words, the terminal end of each distribution duct 18 is in direct communication with the initial end of a corresponding second lubrication duct 20.

In a preferred embodiment, the lubricant entrance hole 15 is made next to the proximal end 11 of the stem 10. The feed duct 14 therefore extends for almost the entire length of the stem, parallel to the piston axis X and laterally to an axial cooling duct, which will be described below, terminating next to the distal end 12. As can be seen in particular in FIG. 3, the distribution ducts 18, made in the distal end portion 12 of the stem 10, also extend parallel to the piston axis X. The feed duct 14 and the distribution ducts 18 are connected to each other by branch ducts 16, which extend from the end of the feed duct 14 in a transversal direction to the piston axis X.

In a preferred embodiment, the piston head 50; 550; 750, has at least one sealing ring 60 housed in a respective ring seat 62. Examples of piston heads with sealing rings to which the teaching of the present invention may be applied are described in WO2007116426A1 and WO2009125437A1, in the Applicant's name.

The ring seat 62 is formed of an annular recess made in the lateral surface of the piston head. Said ring seat 62 is radially delimited by a bottom 62' and axially at least by a rear rim 62a, preferably also by a front rim 62b situated near the front surface 602 of the piston head.

For example, the bottom of the seat 62 of the sealing ring may advantageously be connected to the front surface 602 of the piston head by connection channels 604 so that the molten metal present in the container may flow under the ring, and solidifying, create a progressive thickening which causes a radial widening of the ring compensating wear and ensuring the sealing effect over time. It is to be noted that, in one embodiment, the sealing ring 60 has a longitudinal split 60', for example step-shaped, which permits its radial expansion.

According to one aspect of the invention, the second lubrication ducts 20 flow at least into the ring seat 62, below the ring. At the open end of said second ducts 20, the sealing ring is closed. Consequently, said second ducts 20 are covered, and therefore protected, by the sealing ring 60 against possible obstructions caused by the metal penetrating between the piston and container 400.

The pressurised lubricant is thereby forced to infiltrate under the sealing ring and to come out of the piston through the interstices between the sealing ring 60 and the piston head 60 and/or through the longitudinal split 60' of the sealing ring 60.

In particular, the pressurised lubricant is forced to come out of the piston through the interstices between the sealing ring 60 and the rims 62a, 62b of the ring seat 62.

To such purpose, the sealing ring 60 is housed with a certain clearance in the respective ring seat 62. Housing with clearance is taken to mean that the sealing ring 60 is not inserted in a forced manner in the respective ring seat 62, but that between the sealing ring and each rim 62, 62b of the ring seat 62 there is a definite and calibrated gap, for example of 0.1 mm or less.

With such a clearance or gap, the pressurised lubricant, for example at 200 bar, can pass between the sealing ring 60 and the rims 62a, 62b of the ring seat 62, while the metal, even if in the liquid state cannot pass through.

It is to be noted that, the expansion of the lubricant under the sealing ring 60, all along the circumference of the ring seat 62, is made possible and favoured not only by the high pressure to which the lubricant is subjected, but also by the elasticity of the sealing ring 60, given by the presence of the longitudinal split 60'.

Thereby a dual effect is achieved: the lubricant, coming out of the interstices between the ring and the seat rims, acts precisely in the area of greatest contact between the piston and the inner surface of the container, that is to say the area of the sealing ring 60; in addition, by coming out on the bottom of the ring seat 62, the lubricant contributes to the radial expansion of the ring when it begins to wear out.

It is to be noted that, the exit passage of the lubricant being made at least by the circular interstices between the sealing ring 60 and the rims 62a, 62b of the ring seat 62, even in the case in which a certain quantity of metal in the liquid state should penetrate between the piston head and the container, it is highly improbable that such quantity of metal should distribute itself exactly around the entire circumference of the interstice between the sealing ring 60 and the rear rim 62a of the ring seat 62. Consequently, conversely to as happens in the pistons of the prior art, it is practically impossible for the metal to completely seal all the interstices between the sealing ring and the piston head and thereby prevent the lubricant from coming out.

In a preferred embodiment, wherein the bottom 62' of the seat 62 of the sealing ring is connected to the front surface 602 of the piston head by connection channels 604 for a flow of metal under the sealing ring 62, between the outlet apertures 604' of said connection channels 604 in the bottom 62' of the ring seat 62 and the rear rim 62 of said seat 62, the sealing ring 60 and the ring seat 62 have slotted coupling portions 606, 608, that, is complementary to each other, which form a sort of labyrinth preventing the metal in the liquid state from penetrating under the sealing ring 60—and in a cooling and solidification step—from reaching the portion of the ring seat 62 between said slotted coupling portions and the rear rim 62 of the seat 62. In other words, the metal in the liquid state which reaches the ring seat 62 through the connection channels 604 is forced to solidify in the front portion of the ring 62 between said labyrinth and the front rim 62b (or, if such front rim 62b is not provided, between the labyrinth and the front surface 602 of the piston head).

In one embodiment shown in FIGS. 1-15, said slotted coupling portions comprise one or a pair of annular ribs 606 which extend from the bottom 62' of the ring seat 62 and corresponding annular grooves 608 made in the inner wall of the sealing ring 60.

In the embodiment shown in FIGS. 16-18 and 23, conversely, the bottom 62' of the ring seat 62 is scored by an annular race 606 which engages a rib 608 extending from the inner wall of the sealing ring 60.

In a preferred embodiment of the piston, an annular channel 610 suitable for receiving the metal coming from the connection channels 604 is made in the bottom 62' of the ring seat 62, in an advanced position in relation to the slotted coupling portions.

FIG. 18a schematically shows the deposit of metal M in the front portion of the ring seat 62, under the sealing ring 60, and in particular in the annular channel 610.

In the embodiments described above, the second lubrication duct 20 which comes out under the sealing ring comes out in rear portion of the ring seat 62 between the slotted coupling portions 606, 608 and the rear rim 62a of the ring seat 62. This way, said second duct 20 is protected, thanks to the labyrinth formed by the coupling portions, from any obstruction caused by the penetration of the liquid metal under the sealing ring 60. It is to be noted that, while the liquid metal which penetrates under the sealing ring 60 is unable to get past said labyrinth on account of its density, its pressure and the fact that it tends to rapidly solidify, the lubricant instead has a density and pressure such as to succeed in insinuating itself between the slotted coupling portions 606, 608 and reaching the front interstice between the sealing ring and the front rim 62b, despite most of the lubricant coming out in the interstice between the ring and the rear rim 62a, in this case finding no obstruction.

Since the lubricant reaches the area of greatest friction between the piston and the container in a targeted manner, the quantity of lubricant needed to ensure adequate sliding of the piston is considerably less than that used in the pistons of the prior art, in which the lubricant is unable to reach the area of the sealing ring.

It is also to be noted that, the sealing ring 60 being positioned near the front end of the piston, the presence of any suction means for placing the chamber of the container in a vacuum, fitted in an intermediate or rear position, has no significant influence on the action of the lubricant.

In a preferred embodiment, the second ducts 20 have a first section 20' parallel to the piston axis X and at least one second radial section 20" coming out at least in the ring seat 62.

According to one embodiment, the piston head 50; 550; 750 is detachably connected to the stem 10; 510; 710. Between the stem and the head sealed fluidic connection means 4; 560 are provided between the first lubrication ducts 14, 16, 18 and the second lubrication ducts 20.

In one embodiment shown in FIGS. 1-21, the distal end 12 of the stem 10 is flanged so as to enable an axial shift between the stem 10 and the piston head 50. In this case, the sealed fluidic connection means comprise connection bushes 4, each inserted with calibrated interference half in a terminal section of a first distribution duct 18 and the other half in the initial section of a corresponding second lubrication duct 20. Each of said halves being fitted with an annular sealing element 61.

Figure 17:
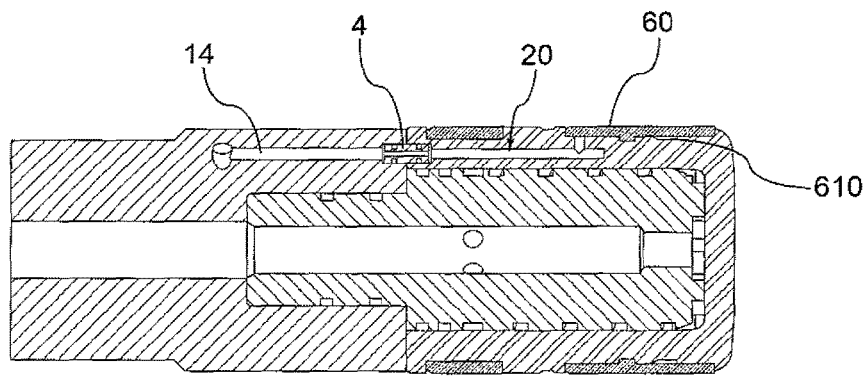
FIG. 17 is an axial cross-section of the piston in FIG. 16, with a sealing ring.
Figure 17A:
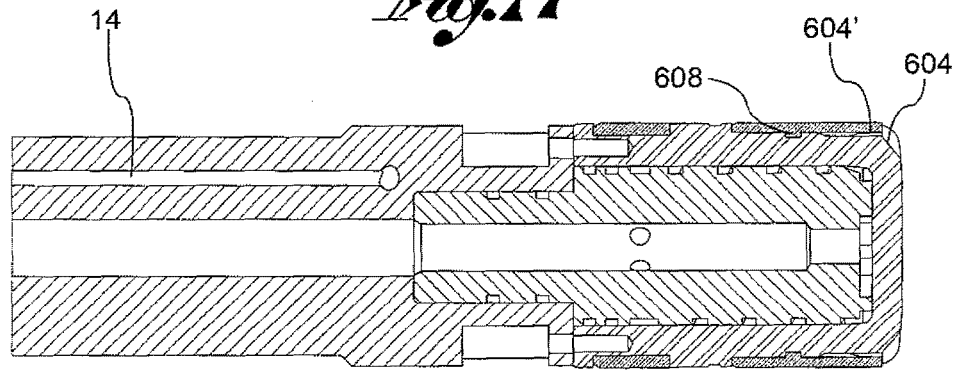
FIGS. 17a and 17b are two further axial cross-sections of the piston in FIG. 16.
Figure 17B:
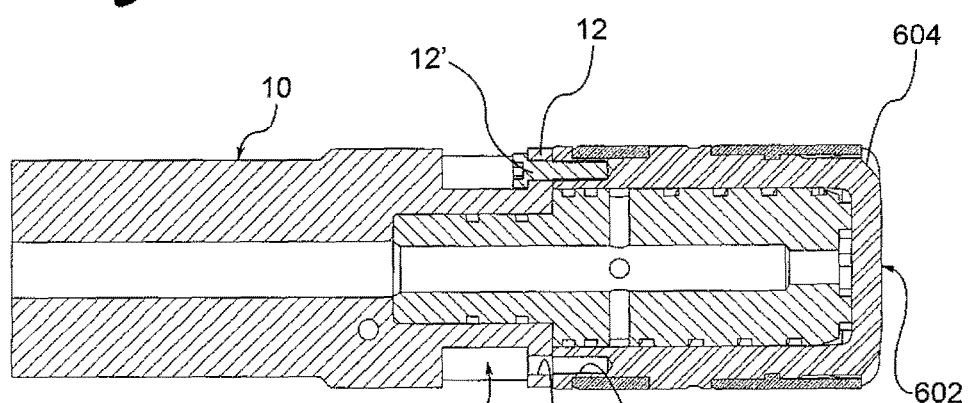

In one embodiment, the distal flanged end 12 of the stem 10 and the adjacent end of the piston head 50 are connected to each other by screws 12' (shown in FIG. 17b). To such purpose, a plurality of radial recesses 22 are made in the lateral surface of the distal end 12 of the stem 10, for example angularly equidistant and of a semi-circular shape, giving access to corresponding screw holes 24 made in said flanged distal end 12, parallel to the piston axis X, and facing corresponding screw holes 24' made in the piston head 50—visible in the view in FIG. 17b. Thanks to said radial recesses 22 it is therefore possible to screw/unscrew the screws 12' of the stem to the piston head.

Consequently, advantageously, during the assembly step of the piston it is sufficient to insert the fluidic connection bushes 4 into the ends of the lubrication ducts 18 or 20, place the two adjacent faces of the stem and piston head in contact and then screw up the connection screws.

Figure 16:
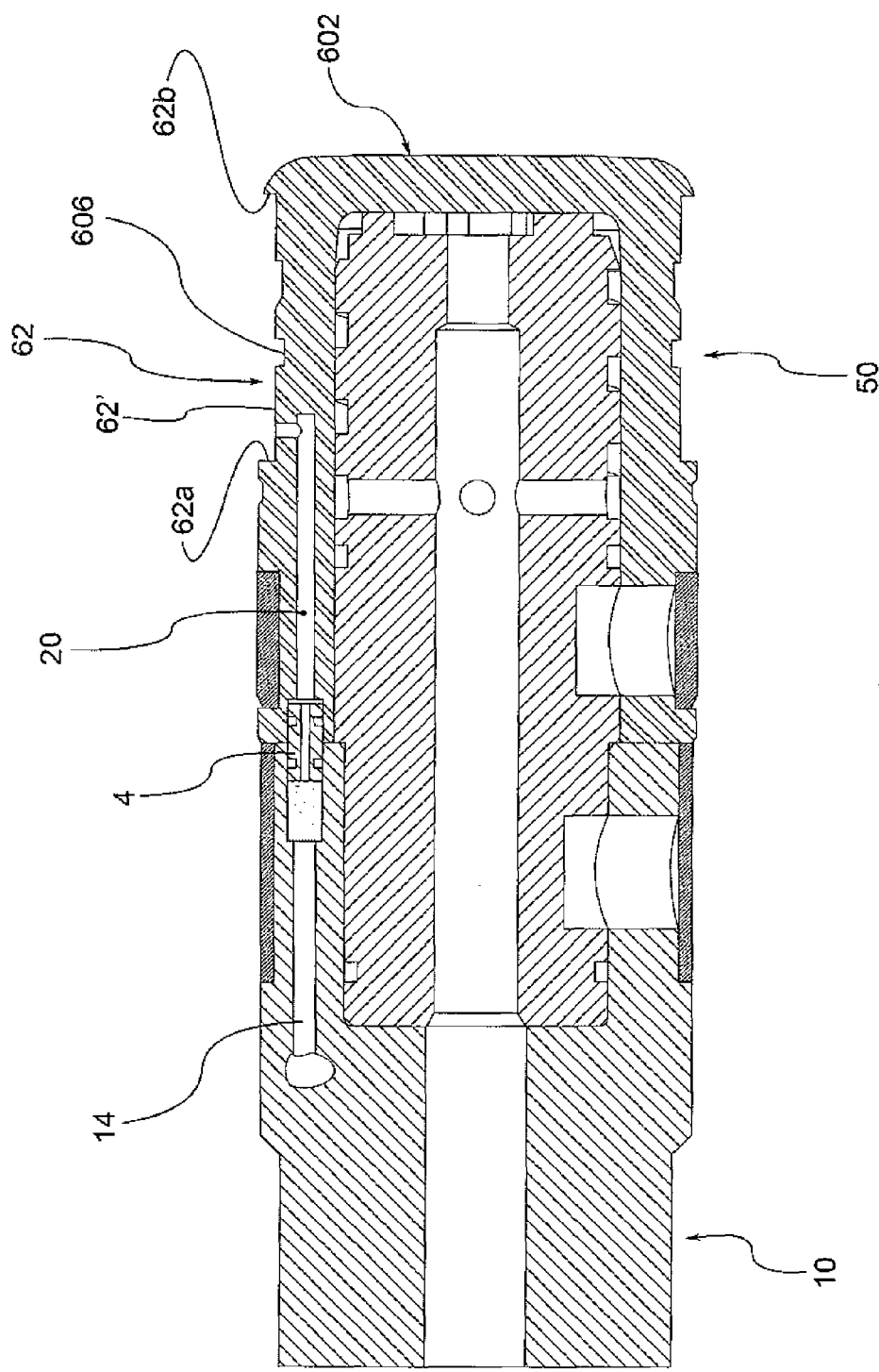
FIG. 16 is an axial cross-section of a piston in one embodiment variation, without the sealing ring.

The piston according to the embodiment shown in FIGS. 16-18, has a similar structure to that described for the piston in FIGS. 1-15 and differs from the latter only by the fact of having only one first lubrication duct 14 which extends in the stem 10 and a single second lubrication duct 20, aligned with the first lubrication duct 14, which extends in the piston head and which comprises, similarly to that described previously, a first longitudinal section 20' and a second radial section 20" coming out in the ring seat 62.

In a preferred embodiment, the piston 1; 500 is suitable for use in a cold chamber die-casting machine. To such purpose, a cooling circuit suitable to make a cooling fluid circulate inside the piston head is made in the stem and in the piston head.

In one advantageous embodiment the piston head 50 comprises a hollow outer body 64, for example in the manner of a cap, on an axial support pin 66; 766. In one embodiment shown in FIGS. 1-21, said axial support pin has a proximal or rear end 67 which fits into a corresponding axial recess 68 made in the distal end 12 of the stem 10.

Advantageously, between the hollow outer body 64 and the pin 66 there is no clearance, at least between the respective lateral walls. In other words, the hollow outer body 64 may not make radial movements in relation to the pin 66. In the same way, the proximal end 67 of the pin 66 is also inserted with calibrated interference, in other words, without clearance, in the corresponding axial recess 68.

Such embodiment solution together with the screwing of the head to the stem by screws distributed around a circular crown, makes it possible to achieve and maintain over time a perfectly coaxial position of the piston head and the stem. In other words, the support pin 66, partially penetrating the stem, act as a guide means and axial support for the piston head 50.

In one embodiment, the stem 10 and the pin 66 have respective and aligned axial cooling holes 70, 72 in which a delivery tube of a cooling fluid is inserted. Said delivery tube 74 communicates with the outside through an entrance hole 80 of the cooling fluid, for example made radially in the stem near the distal end 12, and comes out on the front surface 76 of the axial pin 66. Said frontal surface 76 is in fluidic communication, for example through a plurality of helical ducts 77, with a spiral cooling channel 78 made in the outer lateral surface of the axial pin 66. Said spiral cooling surface 78 therefore makes the cooling fluid circulate around and all over the outer surface of the axial pin 66 in contact with the hollow outer body 76, cooling it. The cooling channel 78 come out in a return duct 82 communicating with an exit hole 84 of the cooling fluid made in the stem.

In one embodiment, said return duct 82 is formed of an annular cavity between the axial cooling hole 70, 72 and the delivery tube 74 of the cooling fluid. For example, the return duct 82 communicates with the spiral cooling channel 78 through one or more radial holes 83 made in the axial pin 66.

It is to be noted that, in a preferred embodiment, the longitudinal lubrication 14 and cooling 70 holes made in the stem 10 are obtained with a machining performed from the rear side of the stem 10. Consequently, to close such holes on said side, the proximal end 11 of the stem 10 comprises a plug 90.

Figure 22:
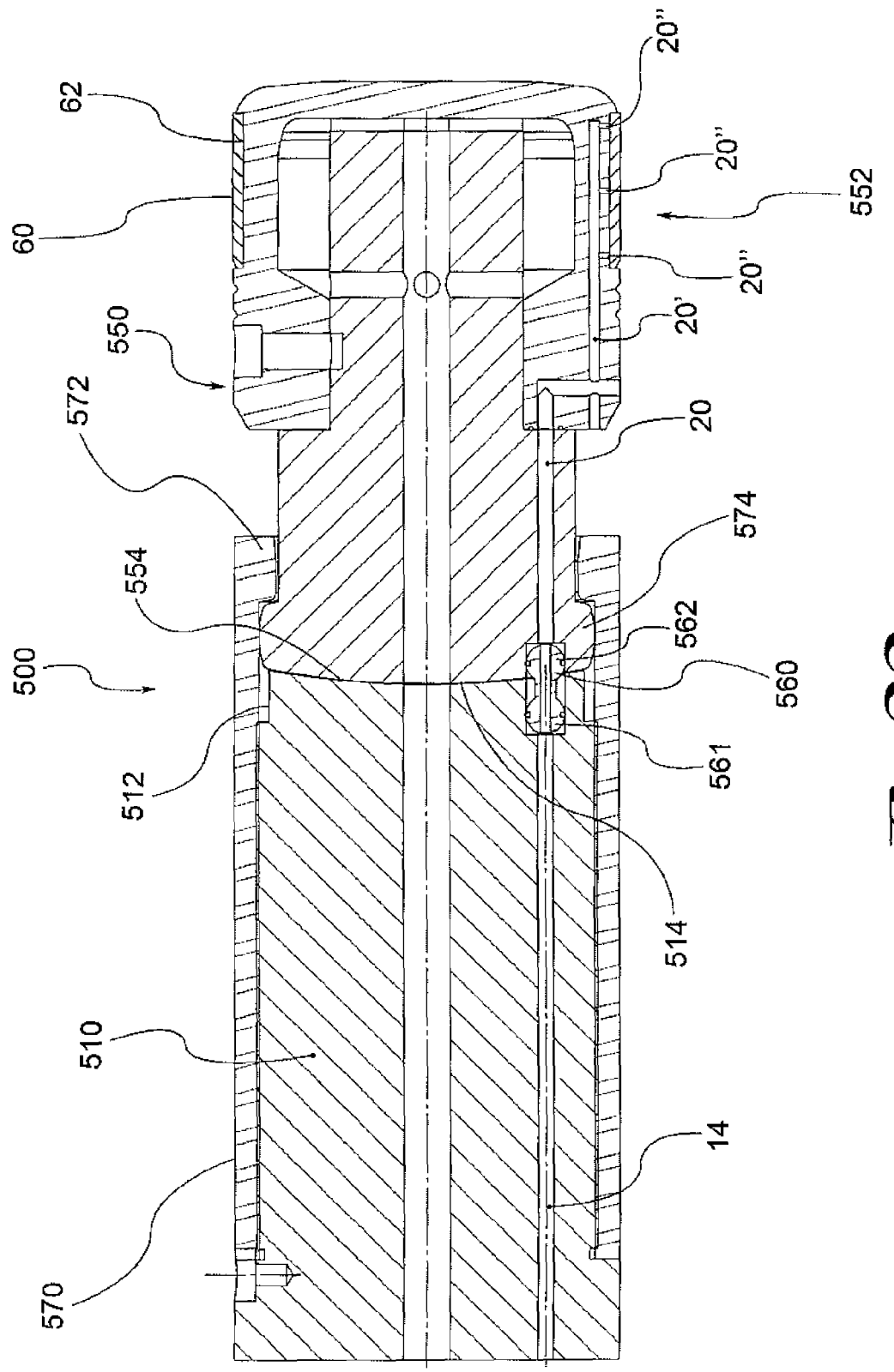
FIG. 22 is an axial cross-section of a piston in one embodiment variation.

In one embodiment variation of the piston 500 shown in FIG. 22, the distal end 512 of the stem 510 and the piston head 550 have respective spherical coupling surfaces 514, 554 so as to form an articulated joint between the stem and piston head. In this embodiment, the sealed fluidic connection means comprise ball joints 560, each having a first spherical end 561 inserted in a terminal section of a respective first lubrication duct 14 and a second spherical end 562 inserted in an initial section of a respective second lubrication duct 20, each of said spherical ends being fitted with an annular sealing element.

In one embodiment, the piston head 550 is constrained in contact with the stem 510 by means of a connection cap 570 attached to the stem. For example, said connection cap 570 has a coupling end portion 572 at the front which forms an undercut in which a rear step portion 574 of the piston head 550 engages.

Figure 23:
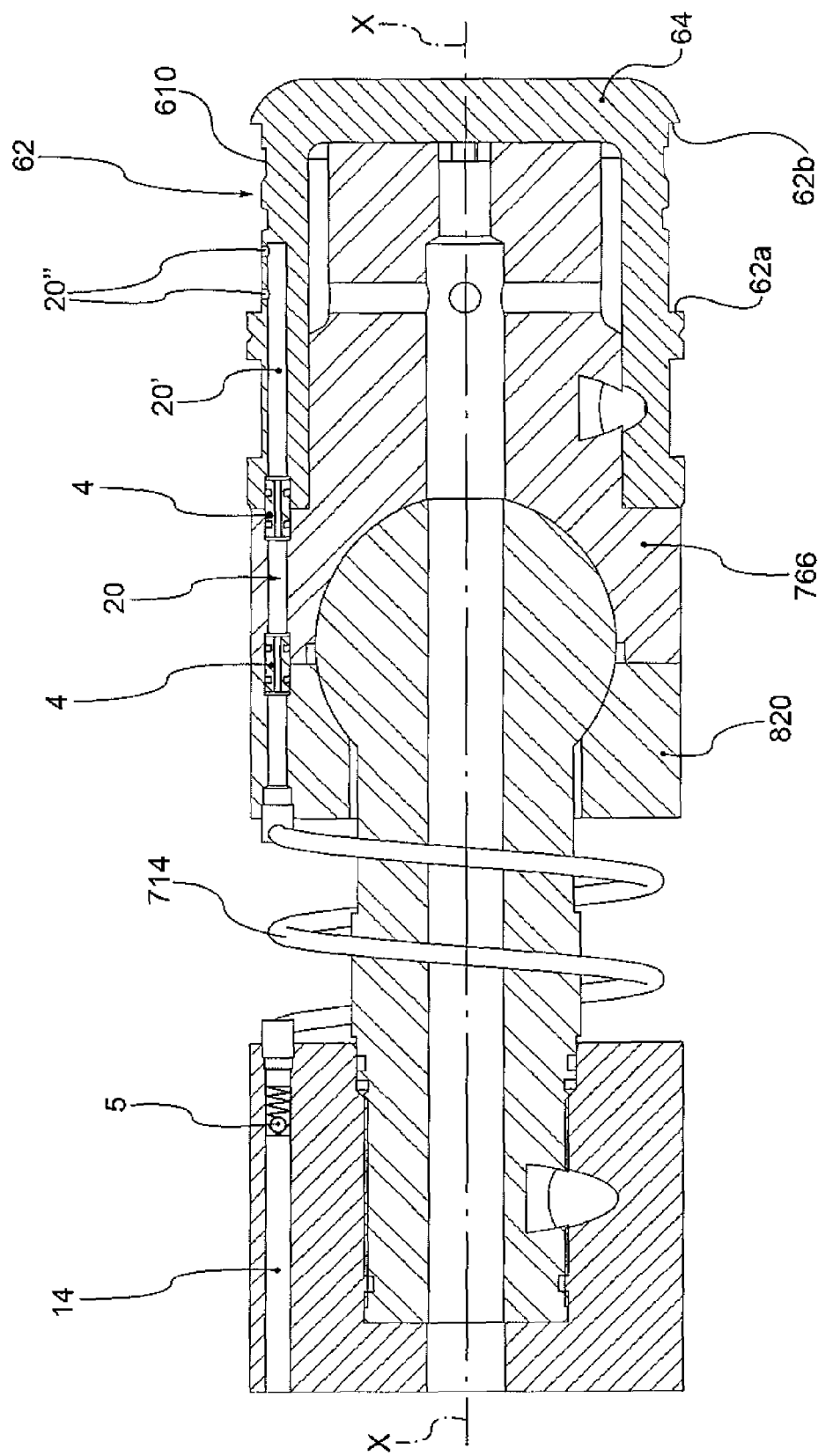
FIGS. 23 and 23a are two axial cross-sections of a piston in a further embodiment.
Figure 23A:
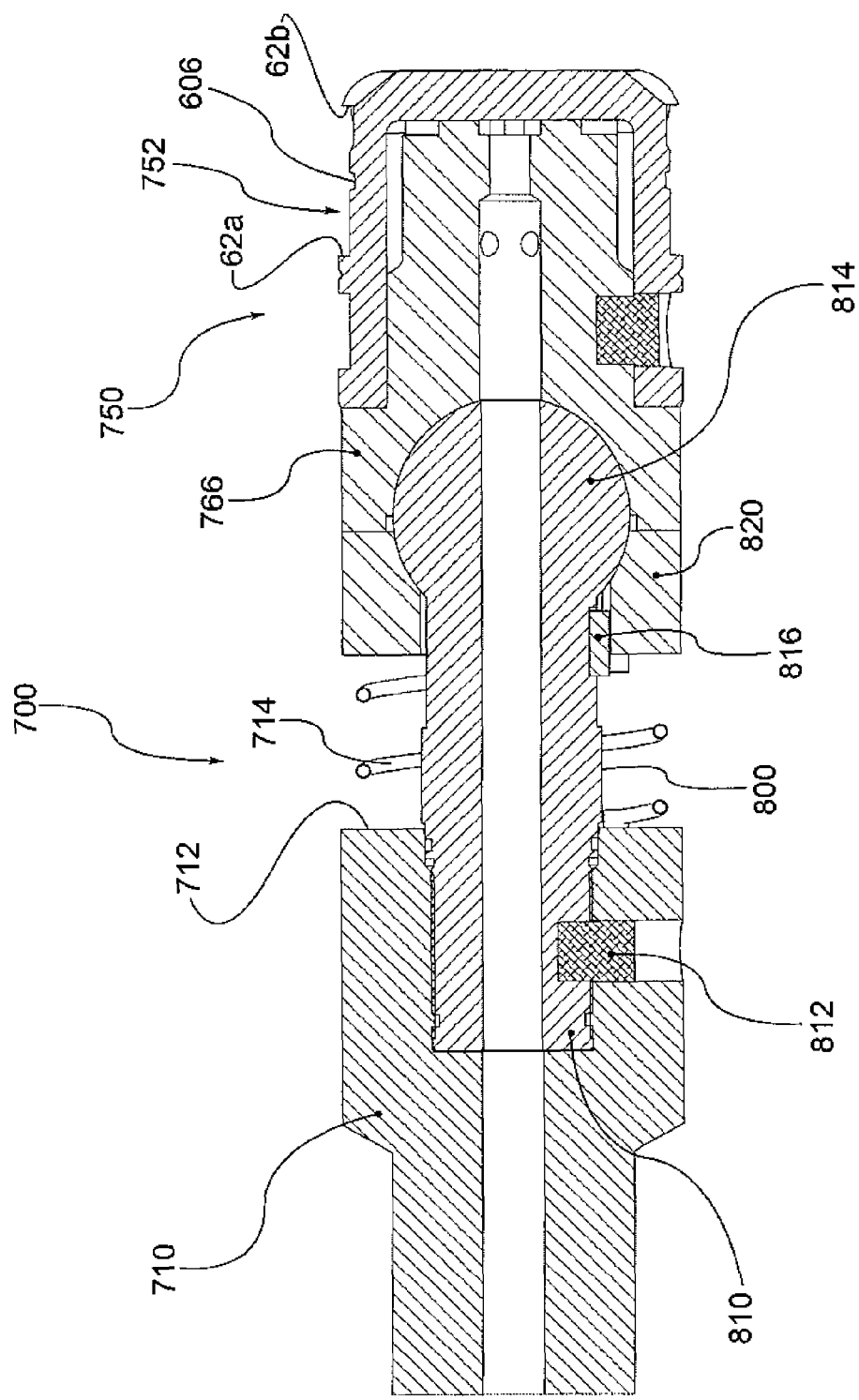

In a further embodiment variation of the piston 700, shown in FIGS. 23 and 23*a*, the piston head 750 is connected to the stem 710 by means of a joint 800. Said joint 800 enables the head 750 to perform deviations of several degrees in relation to the piston axis X, and therefore in relation to the stem 710, for example so as to be able to slide in a container 400 not perfectly rectilinear.

The joint 800 has a rear portion 810 coupling to the stem and a spherical head 814 which the piston head 750 is fitted to. The rear portion 810 is axially and radially attached to the stem 710, for example by means of radial blocks 812.

For its assembly to the spherical head 814, the piston head 750 comprises a rear flange 820 which surrounds the rear portion of the spherical head 814 and which is detachably attached, for example by screws, to a rear portion of the pin 766 which surrounds the front portion of the spherical head 814.

In addition, preferably, the rear flange 820, and thereby the entire piston head 750, is angularly attached to the joint 800, that is, is prevented from rotating around the piston axis X, for example by means of a key 816. This way, the second lubrication duct 20, and in particular the end section 20", is always facing in the desired direction, normally upwards. In fact, the piston is thus lubricated by the descending lubricant; in addition, the metal in the liquid state is less likely to solidify on the upper, hotter part of the piston.

In this embodiment, the piston head 750 being distanced from the stem 710, the first lubrication duct 14, made in the stem 710, is fluidically connected to the second lubrication duct 20, made in the piston head 750, by means of a connection tube 714. Preferably, said connection tube 714 is a spiral shape or is in any case suitable for permitting the movements of the piston head 750 in relation to the stem 710.

The sections of the second lubrication duct 20 made in the rear flange 820, in the pin 766 and in the hollow body 64 are connected to each other by means of the connection bushes 4.

In a preferred embodiment, at least one check valve 5 is placed along the lubrication circuit, for example in the first lubrication duct 14, suitable for guaranteeing the unidirectionality of the flow of lubricant from the stem to the piston head.

The invention claimed is:

1. Piston for a die-casting machine, where said machine comprises a press with a container in which the piston is housed so as to slide, the piston comprising:
   a stem extending from a proximal end to a distal end along a piston axis;
   a piston head which extends from the distal end of the stem and which is provided with at least one sealing ring housed in a respective ring seat made in a lateral wall of said head to form a seal on the wall of said container of the press, said sealing ring being interrupted longitudinally by a longitudinal split which permits the radial expansion of the sealing ring; and
   a lubrication circuit suitable to encourage the sliding of the piston in said container and comprising:
   at least a first lubrication duct made in the stem and ending at the distal end of said stem, and
   at least a second duct made in the piston head, fluidically communicating with said first duct and coming out in said ring seat, under the sealing ring, said second duct being covered by the sealing ring, so that the lubricant comes out of the piston head through the interstices between the sealing ring and the piston head and/or through said longitudinal split, wherein the interstices comprise a calibrated gap between the sealing ring and each rim of the ring seat, said calibrated gap having a breadth such that the lubricant can pass between the sealing ring and each of said rims, while metal, even if in a liquid state, cannot pass through the sealing ring and each of said rims, and such that the lubricant expands under the sealing ring, all along the circumference of the ring seat.

2. Piston according to claim 1, wherein said interstices comprise at last one interstice between the sealing ring and the rear rim which defines the ring seat rearwards.

3. Piston according to claim 1, wherein said interstices have a breadth of 0.1 mm or less.

4. Piston according to claim 1, wherein the bottom of the ring seat is connected to the front surface of the piston head by connection channels for a flow of metal under the sealing ring, and wherein between the outlet apertures of said connection channels in the bottom of the ring seat and the rear rim of said seat, the sealing ring and the ring seat have slotted coupling portions suitable for stopping the transit of metal in a liquid state from penetrating under the sealing ring.

5. Piston according to claim 4, wherein said second lubrication duct comes out in the rear portion of the ring seat included between said slotted coupling portions and the rear rim of the ring seat.

6. Piston according to claim 1, wherein the first lubrication ducts comprise a feed duct which extends longitudinally from a lubricant entrance hole and which branches into at least two distribution ducts angularly equidistant in relation to the piston axis, the second lubrication ducts being a continuation of said distribution ducts.

7. Piston according to claim 1, wherein said second ducts have a first section parallel to the piston axis and at least one second radial section coming out in the ring seat.

8. Piston according to claim 1, wherein the piston head is detachably connected to the stem, and wherein between the stem and head sealed fluidic connection means are provided between the first and second lubrication ducts.

9. Piston according to claim 8, wherein the distal end of the stem is flanged so as to enable an axial shift between the stem and the piston head.

10. Piston according to claim 8, wherein said sealed fluidic connection means comprise connection bushes, each inserted with calibrated interference half in a terminal section of a distribution duct and the other half in the initial section of a second lubrication duct, each of said halves being fitted with an annular sealing element.

11. Piston according to claim 9, wherein said flanged end of the stem and the adjacent end of the piston head are connected to each other by screws.

12. Piston according to claim 8, wherein a cooling circuit is made in the stem and in the piston head suitable to make a cooling fluid circulate inside the piston head.

13. Piston according to claim 8, wherein the piston head comprises a hollow outer body fitted without clearance on an axial support pin having a proximal end which fits into a corresponding recess made in the distal end of the stem.

14. Piston according to claim 13, wherein the stem and the pin have an axial cooling hole in which a delivery tube of a cooling fluid flowing onto the front surface of the axial pin of the head is inserted, said front surface being in fluidic communication with a spiral cooling channel made in the outer lateral surface of the axial pin.

15. Piston according to claim 14, wherein said cooling channel is in fluidic communication with a return duct flowing into an exit, hole of the cooling fluid made in the stem.

16. Piston according to claim 15, wherein said return duct is formed of an annular cavity between the axial cooling hole and the delivery tube of the cooling fluid.

17. Piston according to claim 8, wherein the distal end of the stem and the piston head have respective spherical coupling surfaces so as to form an articulated joint between the stem and piston head.

18. Piston according to claim 17, wherein the sealed fluidic connection means comprise ball joints, each having a first spherical end inserted in a terminal section of a distribution duct and a second spherical end inserted in an initial section of a second lubrication duct, each of said spherical ends being fitted with an annular sealing element.

19. Piston according to claim 17, wherein the piston head is constrained in contact with the stem by means of a connection cap attached to the stem.

20. Piston for a die-casting machine, where said machine comprises a press with a container in which the piston is housed so as to slide, the piston comprising:
   a stem extending from a proximal end to a distal end along a piston axis;
   a piston head which extends from the distal end of the stem and which is provided with at least one sealing ring housed in a respective ring seat made in a lateral wall of said head to form a seal on the wall of said container of the press, said sealing ring being interrupted longitudinally by a longitudinal split which permits the radial expansion of the sealing ring; and
   a lubrication circuit suitable to encourage the sliding of the piston in said container and comprising:
   at least a first lubrication duct made in the stem and ending at the distal end of said stem, and
   at least a second duct made in the piston head, fluidically communicating with said first duct and coming out in said ring seat, under the sealing ring, said second duct being covered by the sealing ring, so that the lubricant comes out of the piston head through the interstices between the sealing ring and the piston head and/or through said longitudinal split, wherein said interstices have a breadth of 0.1 mm or less.

\* \* \* \* \*